United States Patent [19]

Tan

[11] Patent Number: 4,746,384
[45] Date of Patent: May 24, 1988

[54] APPARATUS AND METHOD FOR PERMANENTLY JOINING PLASTIC SCREW CONVEYOR FLIGHTS

[75] Inventor: Michael K. Tan, Metairie, La.

[73] Assignee: The Laitram Corporation, Harahan, La.

[21] Appl. No.: 39,697

[22] Filed: Apr. 20, 1987

[51] Int. Cl.$^4$ ............................................. B32B 31/06
[52] U.S. Cl. ................................ 156/82; 156/244.22; 156/304.3; 156/304.6; 156/497; 198/666; 198/677
[58] Field of Search ...................... 156/82, 94, 244.22, 156/304.2, 304.3, 304.6, 497, 498, 500; 198/625, 654, 666, 671, 677; 403/268, 269, 270, 292, 294

[56] References Cited

U.S. PATENT DOCUMENTS

| | | | |
|---|---|---|---|
| 2,815,852 | 12/1957 | Harrer | 198/666 |
| 3,664,444 | 5/1973 | Hensen | 198/666 |
| 3,839,126 | 10/1974 | Haller | 156/497 |
| 4,691,818 | 9/1987 | Weber | 198/666 |

Primary Examiner—Caleb Weston
Attorney, Agent, or Firm—James C. Kesterson

[57] ABSTRACT

Apparatus for bonding or joining confronting edges of flights of adjacent integrally molded screw conveyor modules is disclosed. The apparatus comprises means for supporting a plurality of the modules in axial alignment and with confronting edges of the module flight members in confronting relationship. Also included is a clamping means for enclosing and maintaining the confronting edges in a fixed position. The clamping means includes at least one passage extending from outside the clamp to a position inside the clamp between the confronting edges. A heated gas such as nitrogen is provided through the passage to the confronting edge to heat the edges substantially to the melting point of the plastic modules. Subsequent to heating the edges with the hot gas, a liquid plastic material under selected temperature and pressure is injected through the clamp passage and into the space between the confronting flight edges to fill the space between the edges and to bond the flights together.

5 Claims, 5 Drawing Sheets

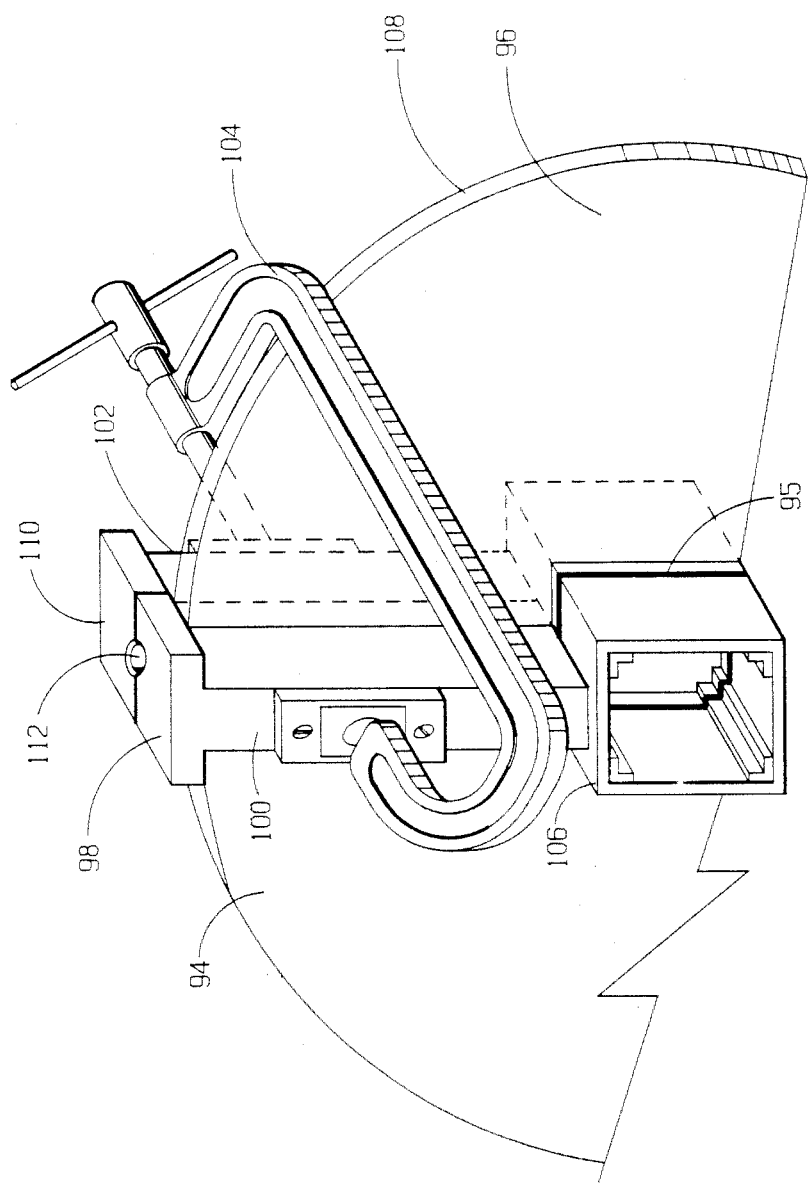

APPARATUS AND METHOD FOR PERMANENTLY JOINING PLASTIC SCREW CONVEYOR FLIGHTS

TECHNICAL FIELD

This invention relates to apparatus and methods for permanently joining or bonding the flights of plastic screw conveyor modules and more particularly to such apparatus for joining the confronting flights of such integrally molded plastic screw conveyor modules in a manner suitable for meeting USDA requirements for food processing. The edges of confronting flights of adjacent modules are enclosed and clamped in place by the apparatus. A hot gas such as nitrogen or air is then injected between the confronting edges of the flights to bring the confronting edges substantially to the melting point of the plastic modules. A plastic material is then injected under pressure and temperature between the heated confronting edges of the enclosed flights and allowed to solidify until complete bonding takes place.

BACKGROUND ART

As will be appreciated by those skilled in the art, specialized helical shaped devices such as screw conveyors are well known for the transport of various bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal and each conveyor was specifically designed for a particular purpose and of a particular length. However, although most prior art conveyors were specifically designed to meet a particular application, there had been some attempts of providing a modular type conveyor of metal and/or wood. Examples of U.S. Patents which disclose such modular conveyors include U.S. Pat. No. 349,233 issued to James Nelson on Sept. 10, 1886; U.S. Pat. No. 455,384 issued to H. Birkholz on July 7, 1891; U.S. Pat. No. 525,194 issued to J. Dyson, et al on Aug. 20, 1894; U.S. Pat. No. 546,879 issued to J. Dyson, et al on Sept. 14, 1895; U.S. Pat. No. 1,867,573 issued to D. G. Leach on July 19, 1932; U.S. Pat. No. 2,492,915 issued to A. B. Carlson on Dec. 27, 1949; U.S. Pat. No. 3,648,826 issued to Dean P. Brooks on Mar. 14, 1972 and U.S. Pat. No. 3,705,644 issued to Claude E. Kawchitch on Dec. 12, 1972. However, a study of the above patents indicates that only the two Dyson, et al patents, the Nelson patent and the Kawchitch patent can be considered sectional or modular. In addition, the assignee of the present application filed an application for Letters Patent on Sept. 29, 1983 for a "Modular Screw Conveyor" and which has Ser. No. 537,345, abandoned, and on Apr. 4, 1984 filed an application for "Mold and Process for Manufacturing Helical Shaped Items" which has Ser. No. 598,374, U.S. Pat. No. 4,693,861. An application entitled "Concealed Drive Coupling for Use With Modular Screw Conveyor" and having Ser. No. 822,641, U.S. Pat. No. 4,691,818, was filed on Jan. 27, 1986. This application is also assigned to the assignee of the present invention.

In addition, it is believed that apparatus is available for bonding sections of plastic pipes together in a fluid or liquid tight manner by heating the ends and pressing the melted ends together. However, the techniques and the overall concept as applied to bonding the edge of flights of adjacent modular screw conveyor sections together is believed to be unique and different from that of bonding plastic pipe together.

As will be appreciated, one of the advantages of the plastic modular screw conveyor is ease of cleaning due to the smooth and non-interrupted surfaces. Also of course, by axially stacking any selected number of modules on the non-circular drive shaft a screw conveyor of any length can be fabricated. For certain applications, it is desirable the confronting edges of the flights of adjacent modules be sealed to each other to strengthen the conveyor and to eliminate any large spaces between the flights which might trap particles of the conveyed material. However, to pass the USDA requirements any process which fills up spaces between flights must not result in any small cavities or openings which could harbor bacteria.

Therefore, it is an object of the present invention to provide apparatus and methods for joining or bonding the confronting edge of a flight of one module to the confronting edge of a flight of a second module in a crevice-free manner.

It is another object of the present invention to provide apparatus and methods which results in a bond or joint such that the joined flight members are in register with each other.

It is yet another object to provide apparatus and methods which allows the flights of a multiplicity of modules to be joined together.

SUMMARY

These and other objects and advantages will be obvious and will in part appear hereinafter, and will be accomplished by the present invention which provides apparatus and methods for bonding confronting edges of the flights of adjacent integrally formed plastic screw conveyor modules. The apparatus of the invention comprises a means for supporting a plurality of integrally molded plastic screw conveyor modules in axial alignment, and with an edge of the flight member of one of the modules in confronting relationship with an edge of the flight member of another one of the modules. The confronting edges to be bonded are enclosed and maintained in a fixed position with respect to each other by means such as a clamp. Gas such as nitrogen is provided at an elevated temperature through a passage in the clamp to the confronting edges of the flight members to heat the edges to substantially the melting temperature of the plastic modules. A plastic material is then provided under temperature and pressure through a passage in the clamp enclosing the confronting heated edges of the module to fill and bond an edge of one module to the confronting edge of an adjacent module.

BRIEF DESCRIPTION OF THE DRAWINGS

The above features of the present invention will be more clearly understood from consideration of the following description in connection with the accompanying drawings in which:

FIG. 4, is an enlarged view of the clamping apparatus of FIG. 2.

BEST MODE OF CARRYING OUT THE APPLICATION

Figure 1:
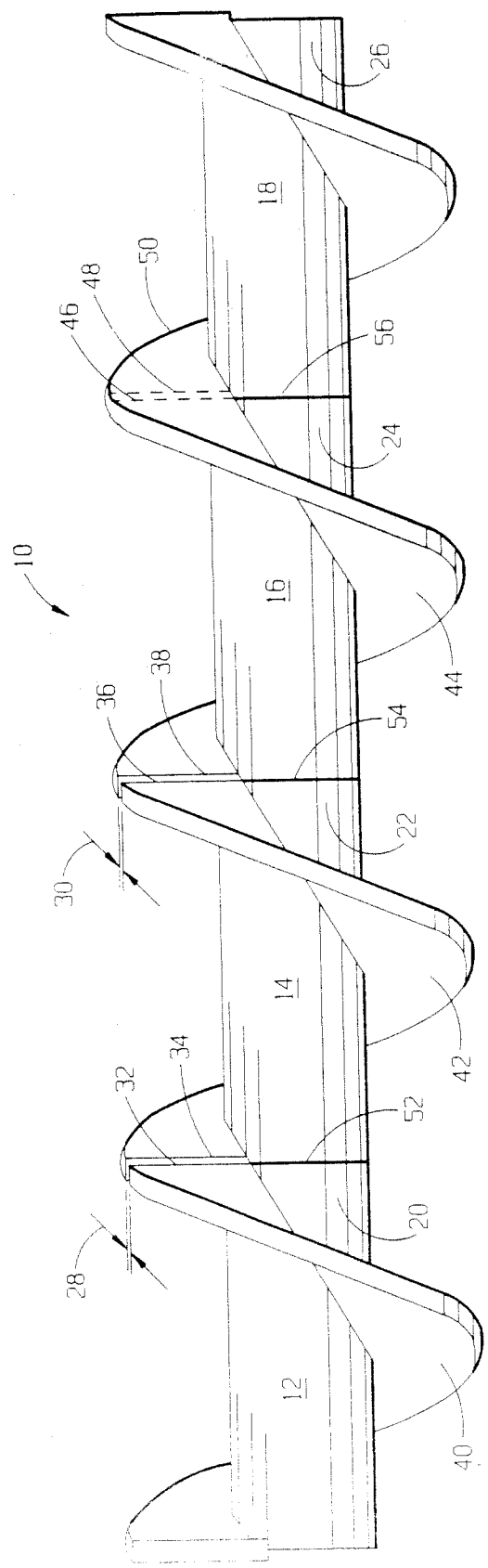
FIG. 1, is a plan view of a plurality of screw conveyor modules showing one set of confronting flight member edges filled and bonded by the methods and apparatus of this invention and two other sets of confronting edges prior to filling and bonding.

Referring now to FIG. 1, there is shown a plan view of a plurality 10 of plastic screw conveyor modules 12, 14, 16 and 18. The modules are axially aligned as shown, and although the hub or axial members 20, 22, 24 and 26 of adjacent modules are joined or bonded and in contact with each other, it is clearly seen that gaps or spaces represented by double arrows 28 and 30 exist between the confronting edges 32 and 34, and 36 and 38 respectively of flight members 40, 42 and 44. On the other hand, the original space indicated by dotted lines 46 and 48 between confronting edges of flight members 44 and 50, illustrate how the space between confronting edges of flight members is filled thereby joining and bonding the edges according to the methods and apparatus of this invention. The USDA requirements can normally be achieved by joining the ends of the axial members or hubs together in a fluid tight manner such that there are no tiny crevices or openings to collect fluids and harbor the growth of bacteria. For example as is shown in FIG. 1, modules 12 and 14 are seen to be clearly bonded together as indicated by seam 52. In a similar manner, modules 14 and 16 are bonded by seam 54 as are modules 16 and 18 bonded by seam 56. As mentioned, typically the bonding of the hubs or axial members of the modules in a satisfactory manner is all that is necessary to achieve USDA approval. When only the bonding of the axial members of the modules is achieved in this way, sufficient gaps or spaces remain between the confronting edges of flight members such that the gaps or spaces can be readily cleaned and inspected. For example, the spaces and gaps indicated by double arrows 28 and 30 illustrate such clearances. However, it is often desirable to have a flight member which has no discontinuities in the entire length of the flight member from one end to the other. To accomplish this, the edges of the confronting flight members must be joined or bonded together, and to meet USDA specifications the bond must be completely free of tiny openings or crevices which could collect bacteria and fluids. Therefore, the resulting joint or bond formed by the apparatus and method of the present invention must be a high quality, smooth and fluid-tight bond.

Figure 2:
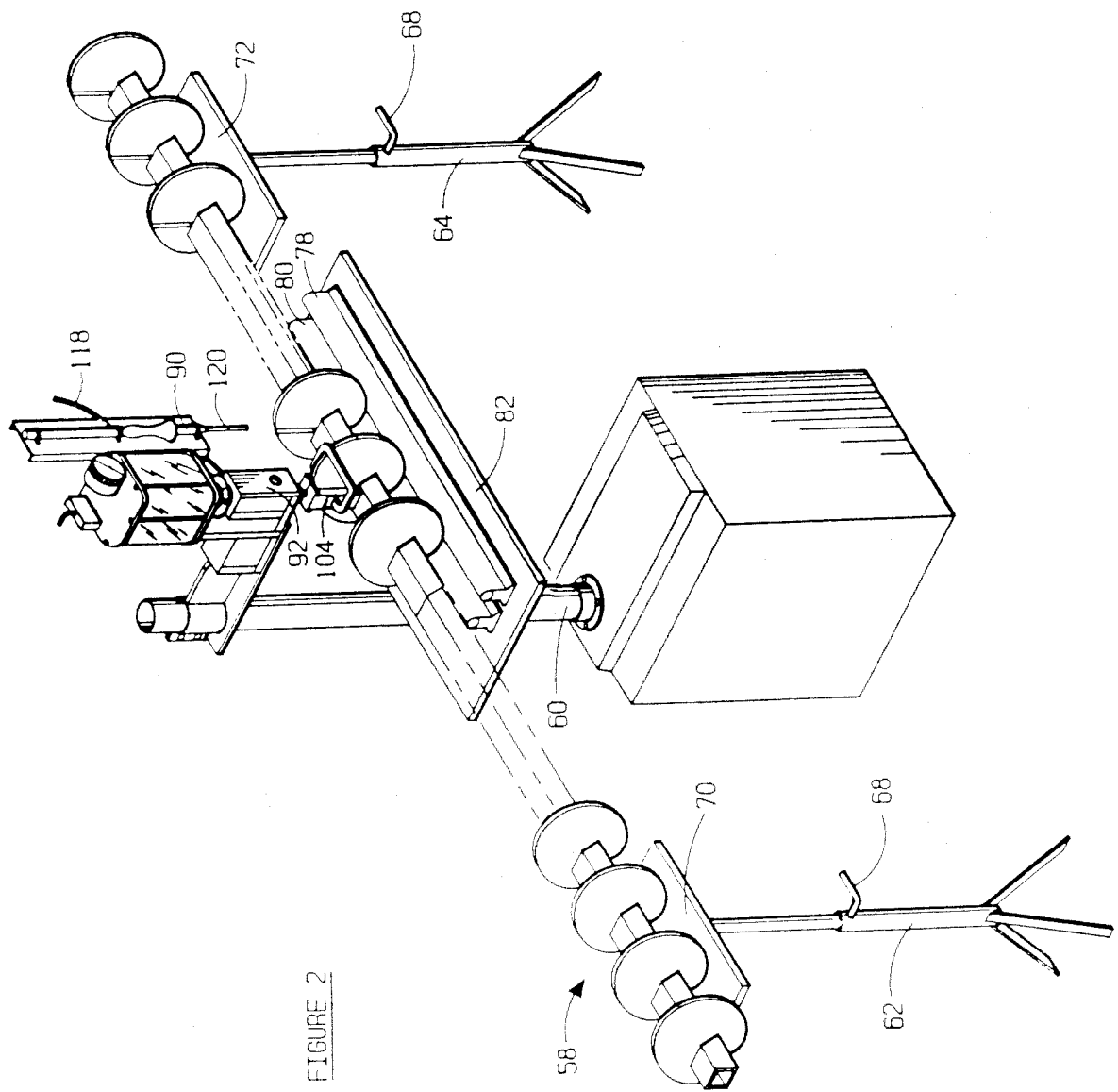
FIG. 2, is a perspective view of one embodiment of the apparatus of the present invention.
Figure 3A:
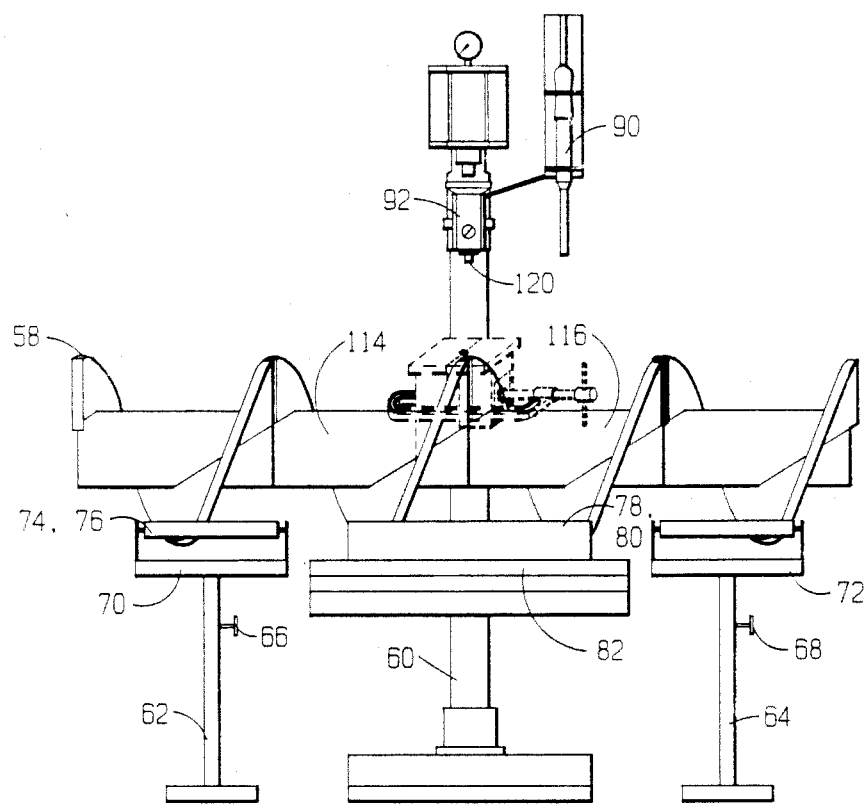
FIGS. 3A and 3B, show a plan view and an end view respectively of the apparatus of FIG. 2.
Figure 3B:
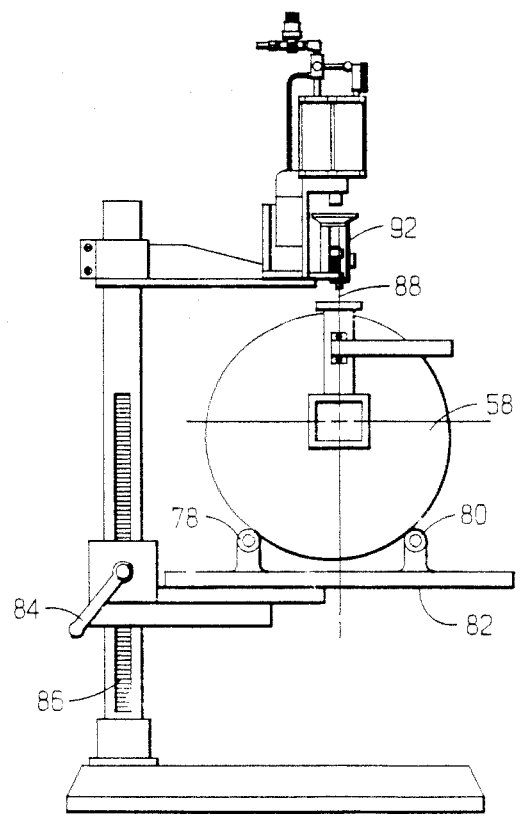

Referring now to FIGS. 2, 3A and 3B, there is shown a perspective view, a plan view and an end view of the apparatus of the present invention which shows a plurality of modules wherein the confronting edges of flight members are being bonded and joined according to the teachings of this invention. As shown in FIGS. 2 and 3A, there is a multiplicity of modules of the screw conveyor which have the flight members joined to provide a continuous flight member the entire length of the modules. As shown, the modules indicated generally as 58 are supported by a three-section support stand or means 60, 62 and 64. The center of primary support unit 60 supports the modules presently being bonded, whereas the auxiliary support stands 62 and 64 simply provide support for those modules already having their flights joined or those modules which will have their flights joined. As can be seen, support stands 62 and 64 may readily have their height adjusted by means of adjusting screws 66 and 68 respectively. In general, the support stands 62 and 64 include a table portion 70 and 72 each of which may hold a pair of parallel support rails 74 and 76 as shown in FIG. 3A (not shown in FIG. 2). These support rails receive and support the flight members of the joined screw conveyor. In a similar manner, the main support means 60 also includes a pair of support rails 78 and 80. Also as can readily be seen, table 82 which carry support rails 78 and 80 may readily be adjusted by means of a crank 84 and rack and gear arrangement indicated by reference number 86. As can be seen, the rails 78 and 80 support the plurality of modular screw conveyors 58 such that centerline 88 of the plurality of screw conveyor 58 is aligned with the heating-head 90 and injection-head 92 to be discussed in detail hereinafter.

FIG. 4, shows flight members 94 and 96 of two axially joined modules as indicated by bead 95. Although blocked from view in the FIG. 4, there will be a gap between the confronting edges of flight members 94 and 96 such as the gaps indicated in FIG. 1 by double arrows 28 and 30. Also as shown there is an enclosing clamp means 98 comprised of two sections 100 and 102 which fit on each side of the two confronting flight members. Enclosing clamp 98 will have a pair of surfaces which will conform to the two parallel helical surfaces of the flight members. For ease of illustration, the enclosing clamp member 98 is shown being held tightly in position by means of a manual C-clamp 104. However, it will be appreciated that in lieu of a simple hand manipulated C-clamp 104, automatic clamping means could be used to hold the two portions 100 and 102 of the clamp in position. As can be seen clamping means 98 extends from the hub 106 of the modules to be joined out beyond the edge 108. Also as will be appreciated, the edges of the clamp fit snugly against the plastic flight members to provide substantially a fluid-tight enclosure. At the top portion 110 of enclosing clamp 98, there is shown an opening 112. As will be appreciated and discussed hereinafter, opening 112 allows hot gases to be provided to the confronting edges of the flight members to be joined and also allows the injection of melted plastic under high temperatures and pressures.

Figure 5:
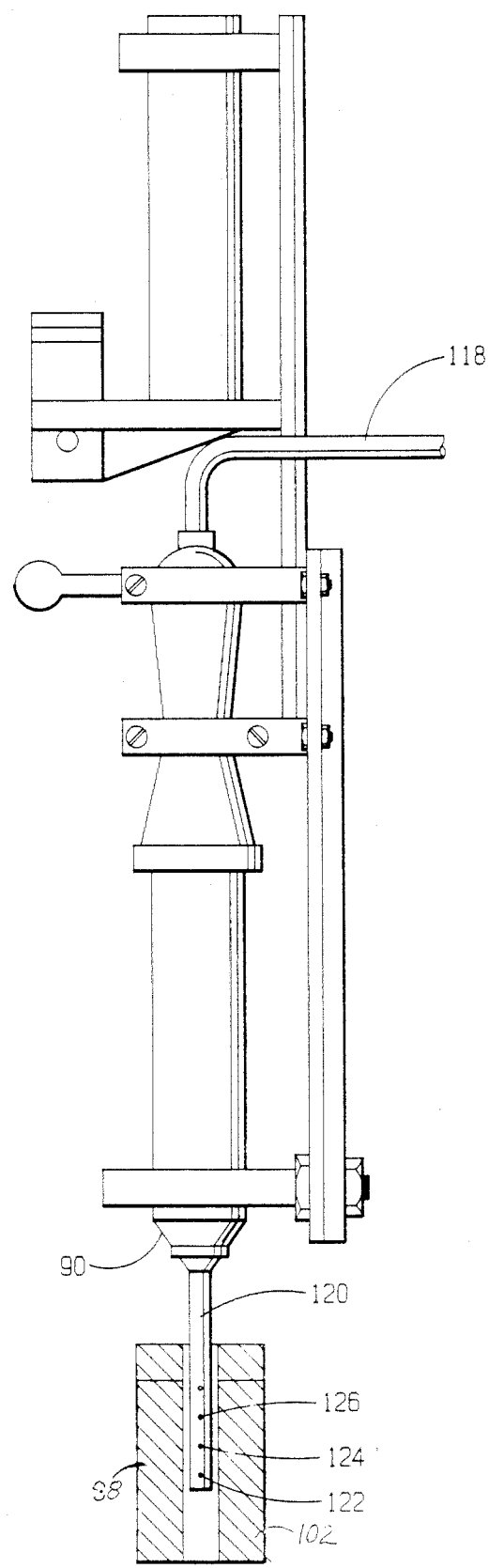
FIG. 5, is a plan view of a portion of the apparatus of FIG. 1 showing means for providing hot gas to the full length of the edges to be bonded.

Referring again to FIGS. 2, 3A and 3B, it will be appreciated that in the embodiment as shown those modules to the left of heating and injection-heads 90 and 92 which are supported by support stand 62 have already had their flights filled and bonded according to the teaching of this invention. In operation, a pair of modules such as modules 114 and 116 are moved to a position directly below heating-head 90. And as shown in FIG. 5, heating-head 90 includes a source of gas such as nitrogen heated to elevated temperatures on the order of 550° F. and provided through tube 118. Heating-head 90 also includes a substantially tubular member 120 which has a cross-section substantially equal and conforming to the cross-section of the space between the two confronting edges of the flight members being joined. In addition, tubular member 120 includes a plurality of apertures or holes such as aperture 122, 124 and 126 such that hot air forced into tube 120 will leave through the apertures. Thus, when the injection tube 120 is inserted completely into the opening 112 of enclosure clamp 98, the tube will be between the two confronting edges of the flight members to be joined and thus when the hot air is forced into the tube the hot air will escape the openings 122, 124 and 126 thereby heating the adjacent plastic confronting edges of the modules to a temperature substantially equal to or slightly less than the temperature of the melting point of the plastic material. As examples only, the confronting edges of the modules to be bonded would be heated to about 550° F., 500° F. and 500° F. for polypropylene, polyethylene and polyurethane respectively. The injection tube 120 is then removed and the pair of modules 114 and 116 to be joined are moved directly below the injection-head 92. Injection-head 92 is lowered such that nozzle 128 is in contact with the opening 112. An appropriate plastic which will be compatible to the plastic of the modules 114 and 116 is then injection under high temperatures and pressures as a liquid form into the space between the two confronting edges of the flight members so as to completely fill the space. Again as examples only, the injection pressure and temperature for bonding polypropylene, polyethylene and polyurethane are 60 PSI at 450° F. for polypropylene, 60 PSI at 375° F. for polyethylene, and 60 PSI at 400° F. for polyurethane.

In the embodiment shown, only a single passage 112 is shown which runs from outside enclosing clamp 98 to the space inside clamp 98 between confronting edges of flight members 94 and 96. However, it will be appreciated that separate passages may be provided for providing the hot gas and the hot plastic . Also, although the use of tubular member 120 is believed to provide more even heating of the edges to be joined or bonded, it is possible to provide the hot gas without the tubular member being inserted.

Once the plastic has been injected, the nozzle 128 is then raised from the opening 112 and the modules 114 and 116 moved out of the way to cool and make ready for the filling and bonding of the next set of flight members. The clamp is then removed leaving the flight members filled and bonded with a smooth joint which meets USDA specifications and requirements.

Thus although there has been described to this point particular embodiments of the apparatus and methods for filling and bonding confronting edges of the flight members of the axially aligned and adjacent screw conveyor modules, it is not intended that such reference be construed as limitations upon the scope of the invention except insofar as to set forth in the following claims.

I claim:

1. Apparatus for bonding at least two confronting edges of flights of adjacent integrally molded screw conveyor modules comprising:
   means for supporting a plurality of integrally molded plastic screw conveyor modules in axial alignment and with an edge of the flight member of one of said plurality in confronting relationship with and edge of the flight member of another one of said plurality;
   means for enclosing said confronting edges and maintaining said edges in a fixed position, said enclosing means including at least one passage from outside said enclosing means to said confronting edges;
   means for providing a gas having an elevated temperature through a passage to said confronting edges to heat said edges substantially to the melting temperature of said plastic modules; and
   means for injecting a plastic material under temperature and pressure through a passage of said enclosing means between said heated and confronting edges of said modules to bond or join an edge of one module of said plurality to the confronting edge of an adjacent module of said plurality.

2. The apparatus of claim 1 wherein said means for providing includes a tube connected to a source of said gas and having a cross-section which substantially conforms to the cross-section of the space between said confronting edges, and which has a plurality of perforations along its length, said tube being inserted through a passage of said enclosing means to a location between said confronting edges such that hot gas provided to said tube escape through said perforations to heat said edges.

3. The apparatus of claim 1 wherein said means for providing a gas is a means for providing nitrogen gas.

4. The apparatus of claim 1 wherein said means for injecting is a means for injecting a plastic suitable for bonding to plastic modules made from a material selected from the group of polypropylene, polyethylene and polyurethane.

5. A method for bonding at least two confronting edges of the flight of adjacent integrally molded screw conveyor modules comprising the steps of:
   supporting a plurality of integrally molded plastic screw conveyor modules in axial alignment and with an edge of the flight members of one of said plurality in confronting relationship with an edge of the flight member of an ajacent one of said plurality;
   enclosing said confronting edges of said adjacent modules in a fluid tight manner, and maintaining said edges in a fixed position;
   providing a gas at an elevated temperature to said confronting edges to heat said confronting edges to substantially the melting temperature of said plastic modules;
   injecting a plastic material under temperature and pressure between said heated and confronting enclosed edges of said modules so as to bond or join an edge of one module of said plurality to the confronting edge of an adjacent module of said plurality; and
   cooling said injected plastic material such that said material changes to a solid thereby providing a bond between said confronting flight members.

* * * * *